July 30, 1957   J. R. OISHEI ET AL   2,800,675
COORDINATED WINDSHIELD WIPER AND HEADLIGHT BEAM CONTROL
Filed Nov. 15, 1954   2 Sheets-Sheet 1
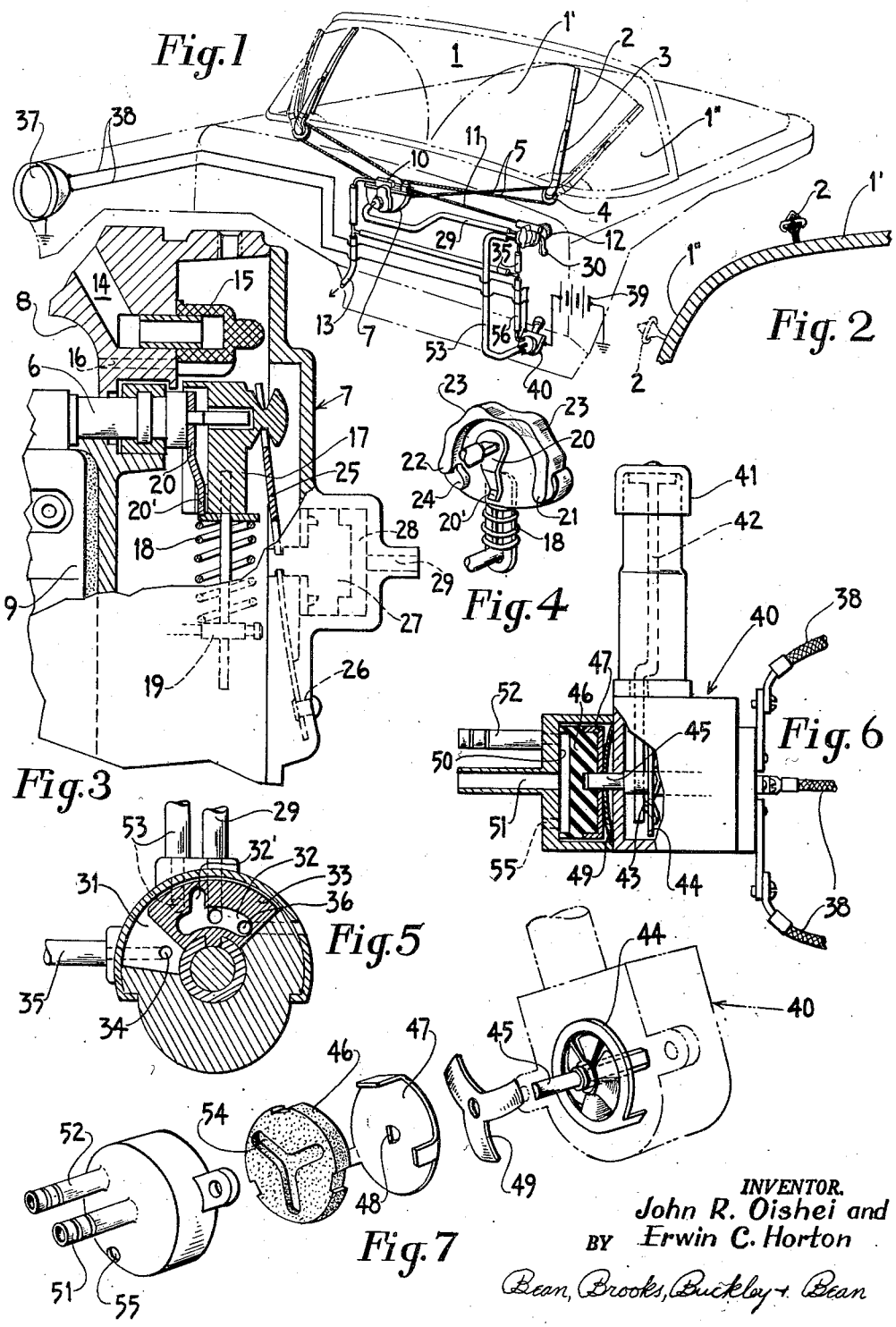
INVENTOR.
John R. Oishei and
BY Erwin C. Horton
Bean, Brooks, Buckley + Bean

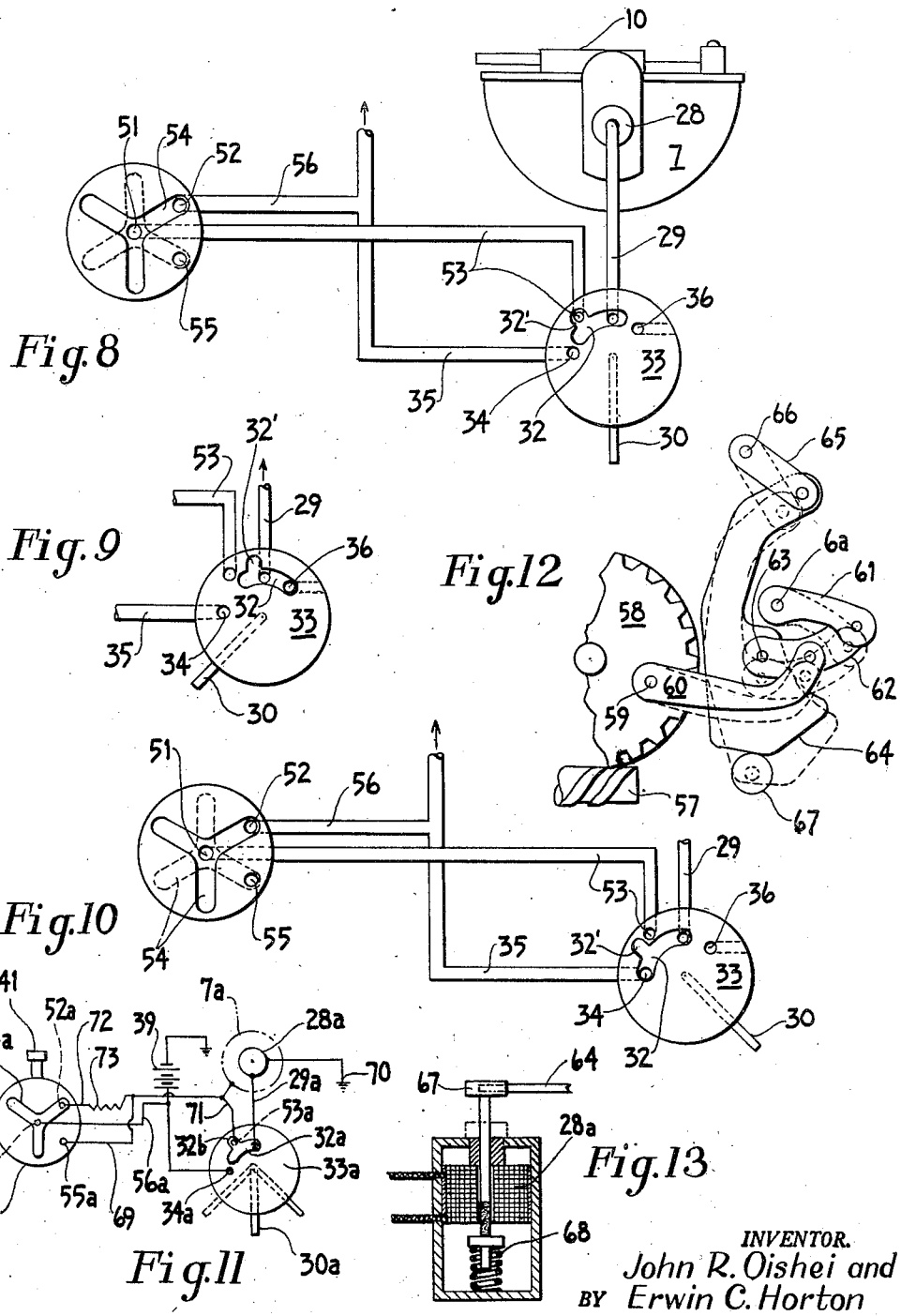

United States Patent Office 2,800,675
Patented July 30, 1957

2,800,675

COORDINATED WINDSHIELD WIPER AND HEADLIGHT BEAM CONTROL

John R. Oishei, Buffalo, and Erwin C. Horton, Hamburg, N. Y., assignors to Trico Products Corporation, Buffalo, N. Y.

Application November 15, 1954, Serial No. 468,669

14 Claims. (Cl. 15—253)

This invention relates to a motor vehicle and primarily to an arrangement for maintaining safe vision ahead when driving at night during inclement weather. It will find a ready field of use on the single lane highways and express highways and thruways having higher legal speeds of travel. The trend in the designing of modern windshields for automobiles has been to extend them around to the sides of the vehicle to afford a better panorama of the roadway both forwardly and laterally. More recently windshield wiper mechanisms have been proposed for this panoramic or wrap-around type of windshield with dual ranges of wiper movement, namely, a panoramic range in which the wipers are prescribed to the cleaning of both the frontal and lateral areas and a frontal, long distance wiping range in which the wiper is confined primarily to the frontal area alone to wipe it at more frequent intervals. At faster speeds of vehicular travel the motorist must focus his forward sight primarily through the frontal area of the shield. At night the visibility ahead is derived from the headlight beams which are focused on the roadway ahead, particularly when the lateral areas of the highways and thruways are unlighted. For slower speeds of travel, and especially on lighted highways, the headlights are utilized with their low beams which provide a short range illumination and includes the lighting of the side areas that may be seen through the entire windshield. The high and low beams of the vehicle headlights afford differing long and short range roadway illumination and bear a definite relation to the more frequent wiping of the narrowed forward range and the relatively less frequent wiping of the full panoramic range of the windshield cleaning mechanism.

The object of this invention is to coordinate the windshield wiping and headlight systems of a motor vehicle to automatically relate or adjust a predetermined range of wiper operation for a given use of headlight beams. The invention provides for the coordination of an improved wiping of the windshield glass to increase the frequency of removal of the rain or snow in the line of forward vision, in conjunction with the operation of the control switch to bring the high or longer light beams of the headlights into use for longer range clear vision in night driving.

A further object of the invention is to utilize the usual two position dimmer switch employed normally for the headlight beam control to either conjointly or independently control the range of the wipe of the blade on the windshield. Thus, the dimmer switch becomes a selector that may be employed either day or night optionally by the car operator to automatically and alternately shift the wiping pattern of the blade into the long range arc of the wiper selectively for more frequent wiping or into the full panoramic vision wipe of the blade with lesser strokes of wiping as in driving at a lesser speed covering less ground and, therefore, accumulating less rain between wipes.

A further object of the device is to confine the use of the floor dimmer switch to the foregoing part-time uses while affording use of the dimmer switch exclusively for headlight beam control whenever the car operator may desire to do so by means of the use of the windshield wiper selector control when the selector is moved into one of its selector positions. This eliminates the headlight floor switch control from any functional use in connection with the selective wiper operation.

Another object of the invention is primarily to utilize the floor-mounted control headlamp switch as a means of automatically controlling the range of the wiping on the windshield glass so that the driver may always more fully clear the glass with the full panoramic wipe when meeting cars moving in the opposite direction on single-lane highways and if desired have the wiper automatically resume the long-range more frequent cleaning of the shield as the beam is raised for lighting longer distances ahead on the road.

Thus it will be apparent that the combination of the headlight beam control and the windshield wiper selector control may be optionally coordinated to work in unison or separately manipulated to achieve the desired ends of obtaining the individual headlight beam control from the floor switch for clearer sighting with more powerful lighting, as well as the individual control of the windshield wiper pattern from the wiper control selector. The operations as outlined here are achieved through the use of conduit means through which engine suction is applied to a selector piston mounted on the motor, whereby the running range of the wiper motor is lessened by the piston in one position and then lengthened alternately by an oppositely arranged position of the piston. Other means may be utilized, such as a Bowden wire control mechanism or a solenoid mechanism, adaptable to be moved by the floor switch action, to in turn employ the wiper selector control cooperatively as stated above or as an interposed mechanism for the selectivity of the range of the wiper in positioning the combination of the headlight beam through the floor switch and the wiper selector control. The light beam floor switch is made inoperative and nonfunctional as far as the wiper is concerned as long as the wiper control selector is out of the neutral or normal position. When the wiper selector control is moved into the super-speed range for more frequent wiping, or into the full panoramic range on the wiper selector, the floor switch is automatically disconnected so as to become nonfunctional.

In the daytime when lights are not needed, the beam control floor switch may nevertheless be actuated for wiping selectively just the same as at night, without any headlamp illumination by reason of the opening of the main headlight switch. At night the particular advantage of the combination, as developed here, is that the high beam of the headlamps is desired for longer range vision, the increased frequency of wiper action will be correspondingly moved into. Then, as the motorist is approached and is about to meet a vehicle moving in the opposite direction, the customarily dimming or lowering of the headlight beam will result in bringing in the slower range of wiper operation, as for example to increase the wiper pattern to the full panoramic wipe—to provide vision through the left or lateral portion of the shield, which otherwise is canceled or cut out in the foreshortened arc and longer vision range of the wiper blade. Upon completing the passing of the vehicle, the driver will lift the headlamp beam for longer range visibility and automatically cut in the long-range greater frequency wiping in the long-beam range lighting.

Provision is made so that the light beam floor switch will not have any effect on the wiping pattern so long as the wiper selector control is out of its neutral position.

In other words, changing the lighting may be carried out continuously at will without modification of the wiper movement.

The above and other objects of the invention will manifest themselves as this description progresses, reference being made therein to the accompanying drawings, wherein Fig. 1 is a fragmentary phantom view of a motor vehicle embodying the present invention;

Fig. 2 is a fragmentary cross sectional view through the frontal and extended side areas of the windshield depicting a wiper in two positions thereon;

Fig. 3 is a fragmentary view partly in elevation and partly in section of the power plant or motor of the windshield cleaning system;

Fig. 4 is a detail perspective view of the automatic valve mechanism of the motor;

Fig. 5 is a cross sectional view of the range selector for the windshield cleaning system;

Fig. 6 is a view partly in elevation and partly in section of the coordinator unit comprising the headlight dimmer switch and a windshield cleaner coordinating valve;

Fig. 7 is an exploded view of the coordinator unit showing more particularly the coordinating valve;

Fig. 8 is a diagrammatic view showing the wiper coordinating passages of the range selector and coordinator unit in relation to the wiper motor, with the selector in its automatic coupling position;

Fig. 9 is a view showing a selector adjusted for sole windshield wiper operation at the greater frequency on the narrowed forward range for super highway travel;

Fig. 10 is a view similar to Fig. 8 but showing the range selector in its panoramic or wide arc wiper operation independent of headlight control;

Fig. 11 is a diagrammatic view showing a modified embodiment of the present invention in which the headlight system has been combined with an electrically actuated windshield cleaning system having dual frequency wiping ranges;

Fig. 12 is a detail view of the variable throw leverage; and

Fig. 13 is a cross sectional view showing the mounting of the displaceable roller.

Referring more particularly to the drawings, the numeral 1 designates the windshield of a motor vehicle having frontal areas 1' each extended around to the side to provide panoramic extensions 1". The numeral 2 indicates the wipers which are carried on spring pressed arms 3 that are fixed to pivot shafts carrying pulleys 4 in turn oscillated by cables 5 from a drive shaft 6 of a wiper motor 7. The wiper arms may be of a normalizing construction serving to maintain the wiping blades 2 in upright positions as they move about the surface curvature, as indicated by the two showings in Fig. 2, such a normalizing construction being disclosed in Patent No. 2,691,186. According to Fig. 3, the wiper motor is of the fluid pressure type having a chamber 8 receiving the vane type piston 9 which is operatively connected to the shaft 6. A control valve, generally indicated by the numeral 10 and made accessible by Bowden wire 11 and a turn knob 12, serves to connect a suction line 13 to a pressure supply port 14 which is alternately connected by a rockable valve 15 to one or the other of two chamber ports 16 by means of a spring snap action. The illustrated snap action comprises a kicker 17 that is journaled on the adjacent end of the motor shaft 6 and a spring toggle arrangement 18 supported on a fixed pin 19 in a manner to permit the spring force to be moved through a dead-center plane including the axes of the shaft 6 and the pin 19. An arm 20 fixed on the shaft to rock therewith has its outer end 20' interposed between spaced shoulders 21 and 22 on the kicker so that as the motor piston 9 pivots in one direction the arm terminal will engage one of the shoulders to swing the kicker with its toggle spring arrangement through the dead-center position to be taken over by the spring arrangement to snap the kicker to the other of its two operative positions. During this movement the cam portions 23 on the periphery of the kicker act upon the valve 15 to switch the suction supply connection to the other of the chamber ports 16 and at the same time to vent the formerly connected chamber port to the atmosphere, thereby reversing the pressure differential on the piston for returning the piston in a new stroke. A shoulder 24 is provided adjacent the shoulder 22, but offset axially and inwardly therefrom to cooperate with the shoulder 21 in defining a foreshortened motor stroke when the kicker is shifted axially of the shaft 6 to bring the shoulder 24 into the path of the arm terminal 20'. The outward limit of movement of the wiper in its two paths or ranges of travel are indicated by the full line and broken line showings in Figs. 1 and 2, the dotted showing indicating substantially the extent of wiper movement around to the panoramic or side areas of the windshield while the full line showing indicates approximately the outward limit of movement of the blade during its travel of greater frequency confined to the frontal area 1' alone, these two portions being shown graphically in the schematic showing of Fig. 2. To accomplish this axial shifting of the kicker, the latter is supported by a spring leaf 25, which is anchored at 26 to the motor casing and normally holds the kicker in its narrow arc higher frequency range so that the shoulder 24 is disposed within the transverse plane of the active portion of the arm terminal 20'. An auxiliary piston 27 operating in a chamber 28, when subjected to a source of suction through the passage 29 under the control of a dash mounted selector 30, will pull the kicker outwardly along the axis of the motor shaft to bring the shoulder 22 within the plane of the arm terminal 20', the shoulder 21 being common to both shoulders 22 and 24. A passage 29 opens through a valve seat 31 for being connected by a recess 32 in the selector valve 33 to a vacuum port 34 which in turn is connected by a conduit 35 to a source of vacuum, such as the intake manifold of the motor vehicle engine or an engine driven vacuum pump. By turning the selector unit 30, 33 to the position shown in Fig. 5 the passage 29 will be vented to the atmosphere through port 36.

All of the foregoing is more fully shown and described in copending application Serial No. 455,211.

The numeral 37 designates one of the two vehicle headlights which latter have their high and low filaments connected by circuit wires 38 to the usual floor mounted dimmer switch 40 and to the storage battery 39. The dimmer switch may be of any approved form, the one illustrated having a spring mounted button 41 with a stem 42 provided with a pawl 43 that is engageable with a ratchet wheel 44 upon each depression of the button 41 and by means of which the headlights will alternately be dimmed and brightened upon successive depressions in a well-known manner, giving a low beam short range illumination for city driving and a high beam long range illumination for the faster open country speeds of travel.

To coordinate the two light ranges or illuminations with the two wiping ranges or, stated in another way, to accomplish the purpose of the present invention by which the higher light power is teamed up with clearer sight power, there is provided an automatic coordinator for the wiper system that is responsive to the floor mounted dimming switch. To this end the ratchet wheel 44 is fixed to turn with its supporting shaft 45 which in turn is keyed to a rotary valve 46 or its carriage 47 as by an irregular opening 48 conforming to a like cross section of the shaft. A spring 49 reacts upon the carriage 47 and the valve 46 to hold the latter firmly engaged with its seat 50 through which opens a centrally disposed chamber port 51 and an eccentric suction or vacuum port 52. The chamber port 51 opens through a selector valve port 53 for being connected by the valve recess 32 and its extension 32' to the chamber passage 29 when the range selector unit 30, 33 is in a position for the automatic coordination of the lighting and windshield cleaning systems, as depicted in Fig. 8. From this position the selector unit 30, 33 may be turned either clockwise to the position shown in Fig. 9, to set the windshield cleaning system in its higher frequency operation on the frontal area 1" of the windshield to the exclusion of the headlight system, or counterclockwise from the automatic position of Fig. 8 to the position shown in Fig. 10 to prescribe the panoramic range of wiper operation for the windshield cleaner system also to the exclusion of the dimmer switch and its headlight system.

In the operation of the coordinated dual systems, for every depression of the floor button 41 the pawl 43 will angularly displace the switch ratchet wheel 44 and its supporting shaft 45 sixty degrees or one-sixth of a complete revolution. The recess 54 of valve 46 is provided with three radial recess arms equally spaced apart one hundred twenty degrees so that for each complete revolution of the valve the three arms will be brought successively into registration once with the vacuum port 52 to connect it to the chamber port 51. Following each depression, the next depression of the floor button will bring the recess arm into registry with the atmospheric port 55, such as illustrated in the broken line showing of Fig. 10, with the result that the chamber 28 of the kicker shifting mechanism will be vented to the atmosphere through the connected passages 29, 53 and 56 to permit the spring 25 to shift the kicker into its short range position. The next depression of the floor button will reestablish the chamber 28 through the passages 29, 32, 53, 54, 52 to the source of suction for restoring the cleaner system for its panoramic wiper stroke. For wiper actuation independently of the headlights it is only necessary to rotate the selector unit 30, 33 either clockwise or counterclockwise which thereby likewise restores the headlight system for its independent control and regulation.

A modified embodiment of the invention is shown in Figs. 11, 12 and 13, the windshield cleaning system incorporating an electric motor 7a having the usual circuit connections to the battery 39 for fast and slow operation. The motor shaft 57 is connected through a worm to a worm gear 58 having a crank pin connection 59 to a pitman bar 60 which in turn is connected to a rocker arm 61 fixed to the wiper shaft 6a through a link 62 which has a pivotal connection 63 to a floating lever 64. The latter is floatingly supported at one end by a link 65, which latter is pivoted at 66 and urged clockwise by a spring, not shown. Normally the action is such that the driving crank pin 59 will oscillate the rocker arm 61 on a short stroke but is adapted to impart a longer stroke to the rocker arm by means of an abutment roller or pin 67 being moved into the path of the floating lever 64 under the urge of a spring 68. This roller is retracted from the path of the floating lever 64 by a solenoid 28a that is energized concurrently with the operation of the electric motor at fast speed. With the selector 33a in the automatic position shown in Fig. 11, the depression of the dimmer switch button 41 will bring an arm of the triarmed contact plate 54a to close the circuit from the battery 39 through circuit wires 56a, contacts 51a and 55a through circuit wires 69 to the electric motor 7a and ground 70 and, concurrently, through the branch connection 71, contact 53a, bridge 32a, 32b, and wire 29a to the solenoid 28a to energize the latter for retracting the abutment 67 from the path of the floating lever 64 with the result that the connected wipers will be oscillated through a short frontal stroke at high frequency.

When the dimmer switch button 41 is depressed again, another contactor arm 54a will close the circuit through contacts 51a and 52a, the wire 72 and resistor 73 to energize the electric motor for relative slower speed previous to which the spring 68 has projected the abutment 67 into the path of the floating lever 64 to give a long or wide arc panoramic stroke to the wipers.

In this embodiment, the range of wiper operation is determined by energizing or de-energizing the solenoid, and when it is energized to effect a short wiper stroke, the motor will operate at its higher speed since the resistor is not functioning at this time. When the solenoid is de-energized and the spring 68 permitted to function, the resistor will be cut in to slow the motor speed for the longer panoramic stroke.

As an alternate to the above, the action of the solenoid and its recovery spring can be reversed on the mechanism so that the solenoid action will be needed for panoramic wiping and at the same time that a resistance is needed in the motor circuit to give the slower operation. Under these conditions the winding of the solenoid could be arranged so that it would take the place of the resistance in the motor circuit and in that way the solenoid will fill two functions; first to change over the mechanism and secondly to function to slow down the windshield wiper motor.

In either embodiment, the systems will be provided with their own individual main controls to render the particular system inoperative, and when both main controls are operative to energize their respective units each unit may be selectively operated to provide their dual functional ranges for either windshield cleaning or roadway illumination. When the two systems are interconnected through the coordinator unit, the dimmer switch then becomes a dual system selector for correlating the two functional ranges of one system with respective functional ranges of the companion system.

The coordination of the dual systems provides a practical combination which will facilitate night driving and encourage the use of the lower beam of the headlights in passing oncoming vehicles. The individuality of each system is readily restored so that its own functioning will be wholly independent of the companion system.

The foregoing description has been given in detail without thought of limitation since the inventive concept is capable of assuming other physical embodiments without departing from the spirit of the invention and the scope of the appended claims.

What is claimed is:

1. A windshield wiper system for a motor vehicle including control means for selective wiper blade operation, means to alter the range of the blade, a headlight having regulatable light diffusion means, and second means selectively operable either to coordinate said blade range automatically with the headlight whereby its diffusion of light may be alternately regulated conjointly with the range of said blade or to regulate the range of the blade independently.

2. In a windshield wiper system for a motor vehicle having a headlight with a regulatable light beam and a foot controlled switch for regulating the same, a hand control means having two positions to preset a wiper blade in either one of two ranges of wiping of a windshield, said control means having a third position to establish a connection with the operating means of said headlight foot controlled switch for energizing said operating means to automatically utilize the movement thereof concurrently with its primary employment to effect the movement of the light beam of said headlight to supplement said wiper hand control means to alter the frequency of movement of the wiper blade.

3. In a windshield wiper mechanism with optionally controllable dual ranges of wiper operation, a three position hand actuated selector and a two position foot actuated selector, said hand actuated selector being arranged to determine a range of greater frequency of wiper operation when it is in one position and to determine the range of lesser frequency when in a second position, and to transfer the selective control of wiper operation from the hand actuated selector to the foot actuated selector when said hand actuated selector is in its third position.

4. In combination with the headlight system of a motor vehicle including a dimming switch control therefor affording long and short ranges of illumination, a windshield cleaning system including wiper means with a drive operable to impart two ranges of wiper operation and a selector control operable to actuate the wiper means in either range, and coordinator means operable by said switch control to actuate the other control for correlating the ranges of illumination with respective ranges of wiper operation.

5. In combination with the headlight system of a motor vehicle including a dimming switch control therefor affording long and short ranges of illumination, a windshield cleaning system including wiper means and a drive therefor having two ranges of wiper operation for fast and slow vehicular travel, with a selector control operable to secure either range of wiper operation, and a control coordinator operable by said switch control to effect operation of the other control for the conjoint use of both systems.

6. In combination with the headlight system of a motor vehicle including a dimming switch control therefor affording long and short ranges of illumination, a windshield cleaning system including wiper means and a drive therefor having narrow and wide ranges of wiper operation with a selector control operable to secure either range of wiper operation, a control coordinator actuated by the dimming switch control to correlate one range of wiper operation with one range of illumination, and means operable to restore independency of operation to both systems.

7. In combination with a headlight system having an adjustable light beam, a windshield wiper mechanism with optionally controllable dual ranges of wiper travel, a hand actuated selector and a foot actuated selector which functions to raise and lower the headlight beam, said hand actuated selector being arranged to determine a full wide range of wiper travel when it is in one position and to determine the other range of travel when it is in a second position, and means including coordinating means operable to transfer the selective control of wiper range travel from the hand selector to the foot actuated selector and cause the range of travel to shift from one range to the other automatically and concurrently with the raising or lowering of the headlight beam.

8. In combination with a headlight system having a regulatable light beam, a windshield wiper mechanism with optionally controllable dual ranges of wiper travel, a hand actuated selector and a foot actuated selector which functions to raise and lower the light beam, said hand actuated selector being arranged to determine full wide range of wiper travel when it is in one position, to determine the other range of travel when it is in a second position, and to transfer the selective control of wiper range travel from the hand selector to the foot actuated selector when in still another position, and coordinating means operable when said hand actuated selector is in the other position to cause the range of wiper travel to shift from one range to the other automatically and concurrently with the movement of said foot actuator.

9. A windshield cleaning system having a wiper, a drive therefor operable to move the wiper back and forth through dual ranges of operation, a selector by which the range of wiper operation may be selected; a headlight system having long and short beams of illumination, and a switch operable to utilize either beam; and coordinating means operable to automatically provide the beams with respective ranges of wiper operation.

10. A windshield cleaning system having a wiper, a drive therefor operable to move the wiper back and forth through dual ranges of operation, means for starting and stopping the wiper, a selector by which the range of wiper operation may be selected; a headlight system having long and short beams of illumination, means for rendering the headlight system operative and inoperative at will, and a switch operable to utilize either beam; and coordinating means operable to automatically coordinate the beams with respective ranges of wiper operation.

11. A windshield cleaning system having a wiper and means for normally oscillating the wiper within a definite range of operation together with means for starting and stopping the wiper, a headlight system having means for energizing it to give a predetermined light beam, means to cause the headlight system to project a second light beam, and automatic means operable concurrently with said second beam means to operate the first means for imparting a different range of wiper operation.

12. A windshield cleaner system having a wiper operable selectively at high frequency and low frequency, selector means operable to select either frequency of wiper operation, a headlight system having high and low beams of illumination, selector means operable to select either beam of illumination, and coordinating means operable to correlate one wiper frequency to a particular beam illumination for concurrent operation.

13. A vehicle window cleaner system having a wiper selectively operable at high frequency and at low frequency, selector means operable to select either frequency of wiper operation, a headlight system having high and low beams of illumination, selector means operable to select either beam of illumination, and coordinating means operable to correlate one wiper frequency to a particular beam illumination and the other wiper frequency to the other beam illumination for concurrent operation.

14. A vehicle window cleaner system having a wiper selectively operable at high frequency and at low frequency, selector means operable to select either frequency of wiper operation, a headlight system having high and low beams of illumination, selector means operable to select either beam of illumination, and coordinating means operable to correlate the high wiper frequency to the high beam illumination and the low wiper frequency to the low beam illumination for concurrent operation.

No references cited.